May 15, 1945. G. S. RADFORD ET AL 2,376,085
PROCESS AND APPARATUS FOR MAKING BALLS AND IMPROVED BALLS
Filed Oct. 11, 1939  2 Sheets-Sheet 2

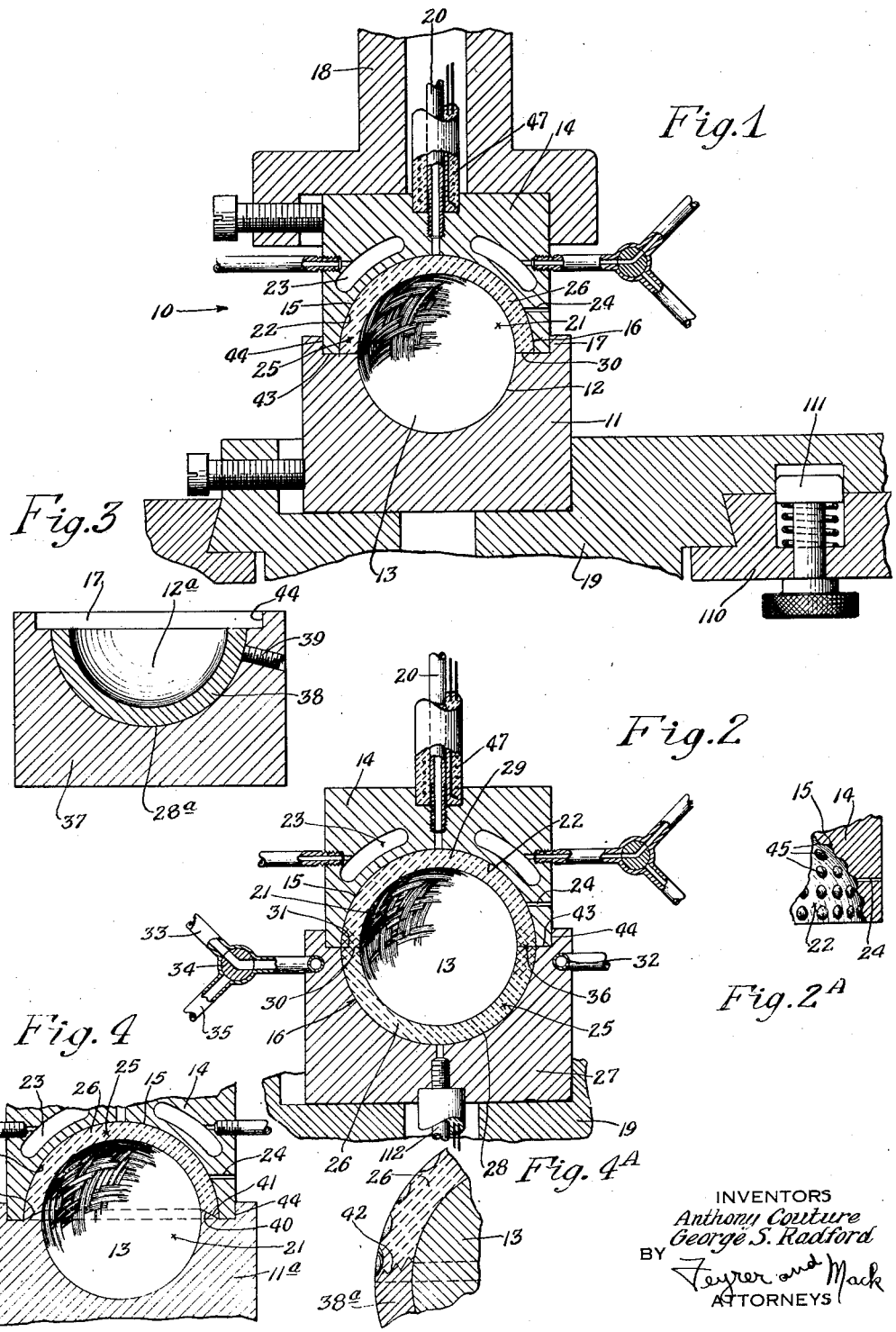

INVENTORS
Anthony Couture
George S. Radford
BY
Feyrer and Mack
ATTORNEYS

Patented May 15, 1945

2,376,085

UNITED STATES PATENT OFFICE 2,376,085

PROCESS AND APPARATUS FOR MAKING BALLS AND IMPROVED BALLS

George S. Radford, New Canaan, Conn., and Anthony Couture, Springfield, Mass., assignors to A. G. Spalding & Bros. Inc., New York, N. Y., a corporation of Delaware Application October 11, 1939, Serial No. 298,914

7 Claims. (Cl. 18—30)

This invention relates to improvements in molding apparatus, to an improved method of molding covers on bodies, and to improved articles.

Although the present invention is applicable to divers objects, it is especially advantageous in molding a spherical cover on balls, such as golf balls.

Heretofore, it has been the most usual practice to form covers on golf balls by first making a spherical body and then enveloping the same with two originally separate hemispherical cuplike member which in turn were forced and shaped upon the spherical body. However, this in effect resulted in a considerable manufacturing cost because: (1) the two separate cuplike members would have to be made for each ball; (2) the cup halves would have to be carefully assembled to the spherical body; (3) the assembly including the spherical body and the two cup halves would have to be carefully placed in a die and there pressed and molded upon the spherical body; (4) a flash line would have to be removed from the finished ball; and, (5) this old and usual practice had the further disadvantages of causing the internal spherical body to be off center if either one of the two cup halves happened to be thicker than the other.

Also, some of these old ways of covering balls required a lengthy time for vulcanization in the mold, which, especially if the material happened to be soft, or become soft in the heated molding die, allowed the ball to settle by gravity within the covering material so that it would finish off-center. The flash, in the old methods, if heavy, and starting to flow from one side of the die, also had a tendency to pull the center to one side of the die.

It is an important object of the present invention to provide an improved method and apparatus for covering spherical bodies, such as golf and other balls, in an economical manner.

A feature resulting from the attainment of this object includes the provision of a simple apparatus whereby it is possible to first partially cover the ball and then to completely cover the remainder of the ball in two simple steps.

A complemental feature of the present invention is the provision of a simple apparatus for first molding one half of the cover thereon and then molding the remaining half.

A further feature is the provision of an apparatus capable of forming a partial cover and locator section, or sections, on a spherical body and for efficiently enveloping the remainder of the body with a cover.

It is another object of the present invention to provide apparatus capable of molding a cover of uniform thickness completely around a spherical body.

The feature of the present invention resulting from the attainment of this objective includes the provision of an apparatus capable of accurately locating a spherical body centrally relative to a die part or parts which shape the exterior of the cover.

It is still a further object of the present invention to provide a highly satisfactory covered object, such as a golf and other ball, in which the cover is of uniform thickness, and is economically formed thereon.

It is a further important object of the present invention to provide an improved method for covering spherical bodies which will insure a large daily production with a product of uniformly high quality.

A feature of this invention is the teaching of a method of first forming a partial cover on a spherical body of a given thickness and subsequently forming the remainder of the body of substantially the same thickness as the part of the cover first formed.

Features of the invention include the provision of: a novel apparatus for injection molding covers on divers objects, and particularly balls; a novel method of injection molding covers on divers objects; and, products, such as balls, with a cover injection molded thereon uniformly, and economically.

Other objects, features, and advantages will appear hereinafter.

In the drawings:

Figure 1 is a cross-sectional view of one form of die for molding part of the cover on a spherical body.

Fig. 2 is a cross-sectional view, similar to Fig. 1, showing the die for molding the remainder of the cover.

Fig. 2A is a fragmentary sectional view showing the inner face of the cavity in the upper die.

Fig. 3 is a sectional view of a modified form of die.

Fig. 4 is a fragmentary sectional view of a still further modified form of die.

Fig. 4A is a fragmentary section view showing a modified form of die and bonding joint.

Figure 5:
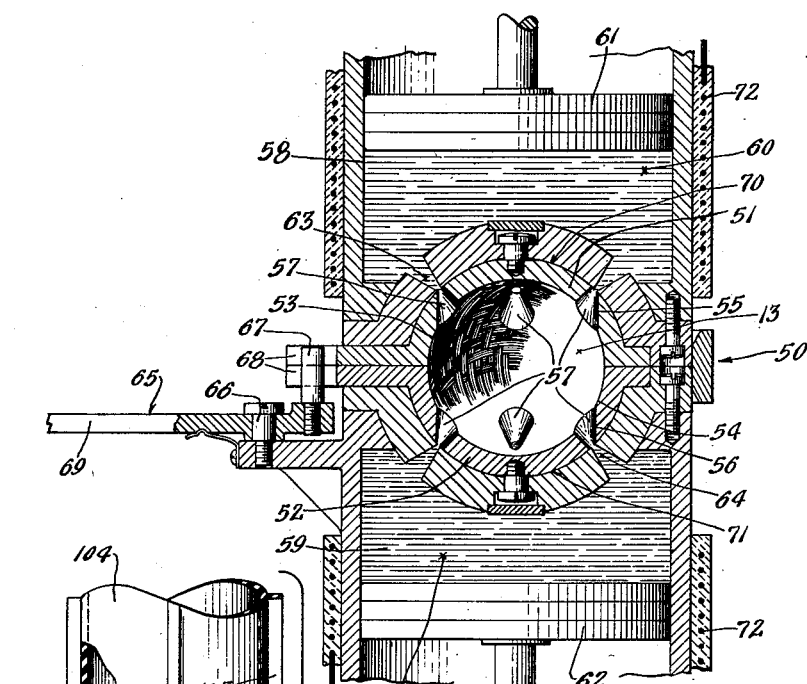
Fig. 5 is a fragmentary sectional view of an apparatus for molding buttons upon a spherical body.

Before describing the present improvements and mode of operation thereof in detail it should be understood that the invention is not limited to the details of construction and arrangement of parts shown in the accompanying drawings, which are merely illustrative of the present preferred embodiments, and the phraseology employed is for the purpose of description and not of limitation.

Referring in detail to the drawings which disclose the present preferred embodiments of the invention, and to Figs. 1–4, inclusive, first, the apparatus of the present invention discloses a complete die 10 including a first or lower die 11 having a locator cavity 12 adapted to receive a spherical body 13. This cavity is preferably of the same diameter as the spherical body. Co-operating with the first or lower die 11 is a second or upper die 14. This second die is provided with a molding cavity 15 of larger diameter than the locator cavity 12. The space between the cavity 15 and the periphery of the spherical body, while the latter is in the locator cavity, is proportioned to form a cover 16 of the desired thickness. The upper and lower dies 14 and 11, respectively, of Fig. 1, may be located in relation to each other as by shoulders 17.

The molding die 10 may be placed in any conventional molding press in order to locate the upper and lower dies 14 and 11 relative to each other and to move the upper die 14 into and out of operative engagement with the lower die 11. Even a simple arbor press may be used for this purpose. Since there are many forms of apparatus for this purpose, only a ram 18 and die base 19 have been shown herein, in order to simplify an understanding of the invention.

The upper die 14 is provided with a duct 20 conducting any suitable plastic material to the cavity 15 and for filling the space between the exposed periphery 21 of the spherical body 13 and the inside face 22 of the cavity 15. As shown, partially by cross-sectional lines in Fig. 1, the duct 20 is preferably surrounded by a suitable heating means such as an enclosed electric heat coil 47, to keep the plastic material in the duct warm and in a semifluid state until it is injected into the cavity. Any of the now well-known machines for storing and injecting a plastic material may be used to force material through the duct 20 into the cavity 15.

Normally the die 10 is cold enough to congeal or set this plastic material when the cavity 15 has been filled. However, if preferred, a chamber 23 may be provided in the upper half 14 to heat and/or cool the die in any usual way, or in the manner set forth hereinafter in connection with Fig. 6. For example, if the plastic material is very hot and a large number of covers formed on balls in the cavity 15 in rapid succession, to prevent the die from overheating and insure separation of the cover from the die, a continuous flow of cold or cool water may be passed through the chamber; and, if the plastic material must be given extra heat for a period of time and then cooled, both heating and cooling mediums may be passed through the chamber 23. A suitable air vent 24 is provided to clear air from the cavity 15 as the plastic material 25 is injected therein to form the locator and half cover 26, shown in Fig. 1.

The apparatus for completely covering the ball includes a secondary lower die 27 as shown in Fig. 2 which is provided with a large cavity 28 of the same diameter or configuration as the cavity 15 of the upper die 14 (or just slightly smaller to allow for the congealing or shrinking of the locator and half cover 26) so that it will accommodate the molded half cover 26 formed on the spherical body 13 as shown in Fig. 1. When the spherical body with a half cover is set in the secondary lower die 27, the upper die 14 is merely superimposed thereon and a second half cover 29 is molded on the spherical body in the same manner as the first half cover, as clearly shown in Fig. 2, by injecting plastic material, through the duct 20 to provide a complete cover 16.

With this apparatus just described in detail, it is possible to form two half covers 26 and 29 on the ball, each of which is of uniform thickness. The two halves are satisfactorily united where they come together, as shown by cross-hatching in Fig. 2, through a regular amalgamation or bonding of the edge 30 with the edge section 31 of the half cover 29 while the latter is still semiplastic or has not yet congealed greatly.

To further insure a proper bonding of the two half covers 26 and 29, a special coil 32 can be provided extending completely around the die 27 near the middle, which in turn through a conduit 33 and two-way valve 34 may alternately be connected to a conduit extending to a source of steam for heating and through a conduit 35 to a source of cold water to set or congeal the joint 36.

If preferred, the die 11 of Fig. 1 may be made somewhat differently like the lower die 37 shown in Fig. 3 so that it has the large cavity 28a corresponding substantially with the cavity of Fig. 2 and may be provided with a liner 38 with a cavity 12a like the cavity 12 of Fig. 1. Thus, it is merely necessary to allow the liner 38 to be in the lower die 37 when the half cover 26 of Fig. 1 is formed and merely remove the liner 38 in order to nest the spherical body 13 with the locator and half cover 26 therein to form the remaining half cover 29. To do the latter it is merely necessary to move the spherical body 13 with the half cover 26 approximately 180° from the position shown in Fig. 1 to the position shown in Fig. 2 after the liner has been removed. The liner 38 may be held in place as by a screw 39 if preferred.

Fig. 4 discloses a further slightly modified form of the present invention differing from the form described primarily in the provision of an angular lip 40 on the lower die 11a of substantially the same width as the lower edge 30 of the half cover 26 to form an angular edge 41. This angular lip may be formed on the lower die 11 of Fig. 1 or may be provided at the upper side of the liner 38 shown in Fig. 3. Preferably, it is provided upon a liner 38a, shown in Fig. 4A, similar to the liner 38 of Fig. 3, so that serrations 42 may also be provided thereon to increase the area of bonding, and the strength of the bond when the second half cover 29 is molded thereon. The spherical body 13 with the half cover 26 may have the other half cover 29 molded thereon in the lower die 27 of Fig. 2 or by placing the same in the lower die 37 of Fig. 3 after the liner has been removed.

Any suitable and usual injection apparatus may be used to force the plastic material 25 through the duct 20 to the space between the cavity 15 of the upper die 14 and that portion of the spherical body 13 not nesting in the lower die 11 when the first section of the cover is molded (viz., when the locator and half cover 26 are molded to the spherical body 13). The duct 20 is preferably flexible so that the ram 18 with the upper die 14 may be reciprocated.

An air vent, such as the vent 24, may be provided to clear air from the die and allow the plastic material to be freely injected therein. If preferred, the air vent may be in the form of a small channel along the faces 43 and 44 of the upper die so that plastic material forced therein is cleared from the die easily when the ball and cover are removed therefrom.

Also, the cavity 15 may, as shown fragmentarily in Fig. 2A, be provided with protuberances 45 or the like to form dimples in the outer surface of the ball.

Referring now to Figs. 5–9, inclusive, there is disclosed a modified form of the present invention, comprising a molding die 50 including an upper die 51 and lower die 52. Preferably both dies 51 and 52 are provided with cavities 53 and 54 respectively adapted to receive the center 13 of the ball and are also provided with recesses 55 and 56 for forming buttons 57 upon the outer surface of the center 13. The location of these recesses, and the shape thereof, is such that the draft or draw of the center 13 with the buttons 57 from the die may be accomplished very easily.

Referring in greater detail to the die 50 and the parts thereof, it will be noted that the die includes reservoirs 58 and 59 for housing suitable plastic material 60 known as cover stock and usually comprising a rubbery mixture. Each of these reservoirs 58 and 59 is backed by plungers 61 and 62, respectively, for forcing the plastic composition through orifices 63 and 64 into the button-forming cavities 55 and 56. Any suitable apparatus may be provided for clamping the die halves 51 and 52 together, and to move the plungers 61 and 62 compressively. For example, any usual and well-known double-ended and double-acting hydraulic press may be provided for the purpose.

In order to sever the buttons 58 from the orifices 63 and 64 the present invention provides a lever 65 pivoted on a stud 66 with a pin 67 entering suitable elongated apertures in fingers 68. If the lever 65 is pivotally moved, for example by grasping and pushing the handle 69, the entire spherical center 13 with buttons 57 thereon are moved free and clear of the orifices 63 and 64. As the buttons 57 in the cavities 55 and 56 move clear of the orifices 63 and 64 the rear walls 70 and 71 of the dies 51 and 52 serve to close the orifices.

The reservoirs 58 and 59 may be heated in any suitable way to keep plastic composition 60 therein in a fluid or plastic state. For example, electrical heating coils 72 may be provided as shown in Fig. 5. Because the button-forming recesses 55 and 56 are very small compared to the reservoirs 58 and 59, the plastic material 60 congeals and hardens sufficiently without the aid of a cooling apparatus. This latter congealing or hardening is also promoted by the cooling exposure of the die cavities 53 and 54 to the surrounding atmosphere when successive cores 13 with the buttons 57 thereon are removed from the die.

Figure 6:
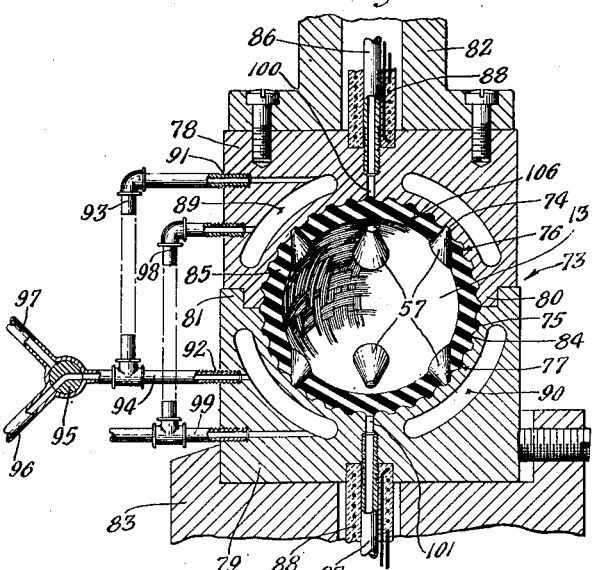
Fig. 6 is a sectional view of an apparatus for molding the remainder of a cover on spherical bodies which have protuberances or locator buttons or the like thereon.

After the centers 13 are provided with buttons 57 as illustrated in Fig. 5, and as just described, they are placed in a secondary molding die 73 as shown in Fig. 6. The previously molded or formed buttons 57 thereon serve to centralize and space the core 13 from the walls 74 and 75 of cavities 76 and 77. The upper and lower dies 78 and 79 are located relative to each other as by the depending flange 80 of the upper die and the upstanding flange 81 of the lower die respectively, and also by a ram 82 and die bed 83 of an arbor or any other usual press. They may be locked or held together against vertical displacement by any suitable means.

The walls 74 and 75 may be provided with a series of round projections 84 or any other desired configuration to impart the desired surface characteristics to the ball.

Each of the die halves 78 and 79 is connected to a reservoir of plastic molding composition 85 as by conduits 86 and 87. Preferably these conduits are surrounded by heating means such as the electrical coils 88. These conduits are preferably flexible in order to permit separation of the dies 78 and 79 relative to each other, so that the cores 13 with the buttons 57 may be initially placed therein, and so that cores with the complete cover molded thereon may be removed from the die, after completion of the molding in the die illustrated in Fig. 6 is effected.

These chambers are through the inlet conduits 93 and 94 connected to a two-way valve 95. The latter is used to cut in a supply of steam or hot water from the conduit 96 and to cut in a supply of cool water or other cooling medium through the conduit 97. Outlet conduits 98 and 99 are also provided to release or take off the heating and cooling medium during alternate changes. Any of the suitable and well-known heating and cooling arrangements may be provided in place thereof.

Normally, intermittent exposure of the cavities 76 and 77 keep the dies cool enough to congeal or set the plastic material therein. However, if preferred, heating and/or cooling of the secondary die 73, and both the upper and/or lower parts thereof, may be effected as by providing suitable chambers 89 and 90 therein, having connections 91 and 92 to sources of steam or hot water and to a cool water. For example, to insure a continually cool die cold water may be forced through the chambers 89 and 90 while successive covers are molded upon centers.

After the center 13 with buttons 57 is placed in the secondary die 73 and the two die halves 78 and 79 brought together the plastic composition 85 is forced through the conduits 86 and 87 by any of the well-known injection molding machines in order to build up a complete covering on the center as shown in general in Fig. 6. The pressure with which this covering composition is forced therein is usually sufficient to effect a good adherence and amalgamation with the previously molded buttons, so that the buttons and the subsequently molded cover are substantially integral. To further insure the proper amalgamation between the buttons and the subsequently molded sections of the cover the centers with buttons may be moved immediately from the first or primary molding die, and while the buttons are still warm and semiplastic, into the secondary molding die. Congealing of the plastic material molded thereon in the die of Fig. 6 tends to tighten upon the buttons 57. Further, because the buttons are tapered as they extend toward the outer surface of the cover the plastic material applied in the die of Fig. 6 tends to lock them to the center 13.

Any suitable air vent, such as the vent 24 of Fig. 1, may be provided in the dies of Figs. 5 and 6, as will be readily appreciated. Conduits 93 and 98 are flexible so that the dies 78 and 79 may be moved together and apart.

After the secondary molding, in the die of Fig. 6, the dies 78 and 79 are separated whereupon the covered object may be removed.

The cover material congeals or shrinks slightly during the cooling so that removal is easily accomplished. If any slight tip remains on the cover at the point where the same extends into the apertures 100 and 101 the same may be easily removed.

Figure 9:
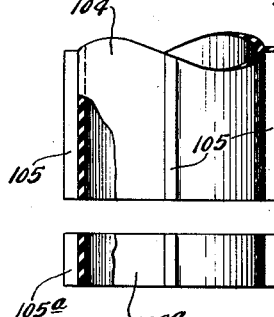
Fig. 9 is a view showing a modified form of locator band.
Figure 7:
Fig. 7 is a detailed view of a locator band.
Figure 8:
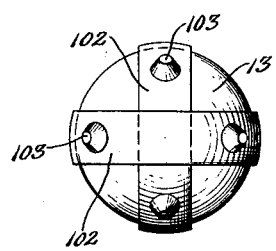
Fig. 8 is a detailed view of a ball with a plurality of locator bands in place.

If preferred the molding of buttons 57 on the core 13 may be dispensed with by merely wrapping bands 102 with uniform buttons 103 onto the core 13, as shown in Figs. 7 and 8. Such bands may be easily and economically molded in large quantities. Alternatively, and even more economically, as shown in Fig. 9, the bands may be extruded in the form of an endless tube 104 with endless ribs or projections 105 thereon, which when cut to short lengths form narrow bands 104a with buttons 105a thereon. A pair of the latter may be snapped upon a core 13 similarly to the bands 102 shown in Fig. 8.

Thereafter cores 13 with either the bands 104a or 102 are dropped into the cavity 77 of the die 79 shown in Fig. 6 and the upper die 78 closed thereon in order to form or mold the secondary cover thereon, all in the manner as hereinbefore described.

From the foregoing it will be apparent that: the first cover 26 of that form of the invention shown in Figs. 1 and 2; the buttons 57 molded to the core as shown in Figs. 5 and 6; and, the buttons 103 or 105a applied thereto, all serve as locators to centralize the object to be covered, such as a ball center, relative to the die for the secondary molding.

The method provided by the present invention includes the steps of: making a suitable core, ball center, or the like; providing locators and partial covers on the core; and forming a secondary or complementary cover therefor.

A further specific method of the present invention consists in the steps of: forming a core, ball center, or the like; molding at least one locator and partial cover on the core, ball center, or the like; centralizing or otherwise locating the core, ball center, or the like in a die with said molded locator and partial cover; and then molding the remainder of a cover on the same. To further insure a good connection between the partial cover first applied to the core, ball center, or the like and the secondary cover, or to have the secondary cover more effectively hold the partial cover first applied, the method consists in: making a core, ball center, or the like; forming and applying at least one locator and partial cover to the same with an angular wall or walls; and molding a secondary and complementary cover on the same which locks with the angular walls on the first or partial cover.

The bands 102 and 104a may be made of any suitable material. Preferably they are made of substantially the same material as the material injected in the die 73 of Fig. 6, and preferably such that it melts or otherwise amalgamates and fluxes with the material forming the secondary cover 106.

The molding material 85 may be in a plastic or a semifluid condition when injected into the foregoing dies, or may be in a granule or pulverized state when injected. With the former separate heating and cooling may usually be dispensed with, and with the latter heating and cooling is preferably used.

The serrations 42 may be extended radially on the angular lip 40 instead of circumferentially as shown in Fig. 4A.

A further, and preferred, modification of the present invention includes merely a combining of those forms of the invention shown in Figs. 1 and 2 in a conventional reciprocating two-way press or in a conventional rotary indexing or dialing press structure.

More particularly, and for example, the die bed 19 may carry both the primary lower die 11 and the secondary lower die 27, and may have a suitable dovetail sliding connection with a base 110 so that first the die 11 is brought into position below the ram 18 and die 14 and then the secondary die 27. A suitable locator 111 may be used to accurately position and hold the dies 11 and 27 below the ram 18.

Thus, the die 11 is first positioned below the ram 18 and die 14 to form the half cover 26, whereupon the ram 18 and die 14 with the half cover 26 are raised relative to lower die 11, and the locator 111 released until the secondary die 27 is positioned centrally under the ram 18, whereupon plastic material is injected through the conduit 112 to form the lower half cover 26.

The apparatus may be of the multicavity type; e. g., may contain a plurality of rams 18 and the bed 19 may be an index plate carrying a plurality of primary and secondary dies 11 and 27 respectively. Also the one ram may be provided with a plurality of dies 11. The secondary die 27 may also be provided with a heating and cooling chamber connected to suitable sources of heating and cooling mediums as described in connection with the chamber 23 shown in Fig. 1. Use of air vents, such as 24, may usually be dispensed with.

If preferred the ram 18 and the bed 19 may both be carried on a large swivel plate, pivoted on a suitable upright or standard, whereby it is possible to move the same through an arc of approximately 180° so that the die 14 with the first half cover will be at the bottom when the second half cover is molded thereon. Conventional knockout pins for molding dies may be provided.

Other variations and modifications may be made within the scope of this invention and portions of the improvements may be used without others.

Having thus described the invention what is claimed as new is:

1. The method of making balls consisting in the steps of forming a spherical body; forming a plurality of generally opposed buttons on said body to partially form a cover; and subsequently forming the remainder of a cover on said spherical body.

2. The method of making balls consisting in the steps of forming a spherical body; placing at least one band with protuberances on said body, to partially form a cover therefor; placing said body and band in a die, with the protuberances engaging the die to centralize the spherical body therein; and subsequently molding the remainder of the cover on the body.

3. In an apparatus for covering spherical bodies the combination of a first large half die; a liner for converting said large half die into a small half die adapted to locate and support the spherical body; a second large half die; means for injection molding material between the spherical body and the large second half die while the spherical body is in the liner and first half die; and means for subsequently forming the remainder of the cover on the body when the liner is removed and the initially molded covered part is in the first half die without the liner.

4. In an apparatus for covering a spherical body the combination of an upper die with a cylinder for plastic material; a lower die with a cylinder for plastic material; nesting mechanism in said upper and lower dies for closely and positively nesting said spherical body against upward, downward and sidewise movement relative to the upper and lower dies; said nesting mechanism including molding means associated with at least one of said dies for forming spherical body locating means and a partial cover around the spherical body; and means for forcing plastic material from said cylinders to said molding means.

5. The method which consists in the steps of forming a concentric spherical body, with a uniform circular surface; molding a plurality of generally opposed buttons on said spherical body with end faces, to partially form a cover; and subsequently forming the remainder of a cover on said spherical body, with an outer face coextensive, circular and concentric with the outer faces on the plurality of buttons.

6. In an apparatus for covering a spherical body, the combination of mating die sections; at least one container for plastic material, said mating die sections having nesting means engaging any part of the exterior of said spherical member for closely and positively nesting it against upward, downward and sidewise movement relative to the die sections, said means forming a means for forming spherical body locating means and a partial cover around the spherical body; and means for forcing plastic material from said container to said molding means.

7. In an apparatus of the class described the combination of a molding die with a wall formation defining a cavity for receiving a spherical body and having an outer wall surface, said wall formation having a plurality of button defining recesses extending therethrough from said outer wall surface and facing said cavity; means having an inner surface opposed and complementary to said outer wall surface for receiving said die for turning movement therein, said means having passage therein for directing plastic material to said recesses; means for forcing plastic material through said passages into said recesses to mold buttons on said body; and means for turning said die relative to said first-named means whereby said buttons are severed from the plastic material in said passages and said passages are closed by said outer wall surface.

GEORGE S. RADFORD.
ANTHONY COUTURE.